(12) United States Patent
McKay et al.

(10) Patent No.: US 6,707,501 B1
(45) Date of Patent: Mar. 16, 2004

(54) HANDLE CONTROL FOR LENS ZOOM SPEED CONTROL

(75) Inventors: Tom McKay, 11339 Taylor Draper La., Austin, TX (US) 78759; Todd Matthew Brower, Austin, TX (US)

(73) Assignee: Tom McKay, Austin, TX (US)

( * ) Notice: Subject to any disclaimer, the term of this patent is extended or adjusted under 35 U.S.C. 154(b) by 484 days.

(21) Appl. No.: 09/588,662

(22) Filed: Jun. 6, 2000

(51) Int. Cl.⁷ .................. H04N 5/262; H04N 5/232; H04N 5/225
(52) U.S. Cl. .............. 348/373; 348/345; 348/240.3
(58) Field of Search ................ 348/373, 374, 348/375, 376, 357, 345, 240.1, 240.3, 211.6, 207.99; 358/906, 909.1; 396/76, 86, 72, 85, 87, 133, 137, 420, 422, 425, 421, 502; 359/696, 697, 823; 248/187.1, 177.1; 224/271, 272; 352/242, 243, 178

(56) References Cited

U.S. PATENT DOCUMENTS

| | | | | |
|---|---|---|---|---|
| 3,602,123 A | * | 8/1971 | Shinkle | 396/425 |
| 3,668,989 A | * | 6/1972 | Winkler et al. | 352/178 |
| 3,893,144 A | * | 7/1975 | Funderburk | 396/425 |
| 4,095,244 A | * | 6/1978 | Yokoyama et al. | 352/243 |
| 4,097,883 A | * | 6/1978 | Adamski et al. | 396/425 |
| 4,206,982 A | * | 6/1980 | Osanai | 352/243 |
| 4,389,675 A | | 6/1983 | Suzuki et al. | |
| 4,407,437 A | * | 10/1983 | Takubo | 348/376 |
| 4,508,944 A | | 4/1985 | Yashima et al. | |
| 4,531,159 A | | 7/1985 | Takubo et al. | |
| 4,574,651 A | | 3/1986 | Nordstrom | |
| 4,668,992 A | | 5/1987 | Bachmann et al. | |
| 4,764,817 A | | 8/1988 | Blazek John M. et al. | |
| D311,198 S | | 10/1990 | Kosugi et al. | |
| 4,974,088 A | * | 11/1990 | Sasaki | 348/211.6 |
| 4,984,090 A | * | 1/1991 | Sasaki et al. | 348/376 |
| 5,065,249 A | | 11/1991 | Horn et al. | |
| 5,068,735 A | * | 11/1991 | Tuchiya et al. | 348/345 |
| D323,182 S | | 1/1992 | Fukuda et al. | |
| 5,081,478 A | | 1/1992 | Hayashida et al. | |
| 5,159,198 A | | 10/1992 | Kohsaka et al. | |
| 5,389,752 A | | 2/1995 | Karbassi | |
| 5,546,126 A | * | 8/1996 | Yajima et al. | 348/207.99 |
| 5,884,107 A | * | 3/1999 | Yajima | 348/357 |
| 6,285,511 B1 | * | 9/2001 | Kanayama et al. | 396/133 |
| 6,292,313 B1 | * | 9/2001 | Kanayama et al. | 359/696 |
| 6,337,952 B1 | * | 1/2002 | Kubo | 396/76 |
| 6,526,232 B1 | * | 2/2003 | Mizumura | 396/86 |

FOREIGN PATENT DOCUMENTS

| | | | |
|---|---|---|---|
| JP | 03-288838 | * | 12/1991 |
| JP | 05-300412 | * | 11/1993 |
| JP | 07-063298 | * | 3/1995 |
| JP | 09-090192 | * | 4/1997 |
| JP | 11-084524 | * | 3/1999 |
| JP | 11-098388 | * | 4/1999 |

* cited by examiner

*Primary Examiner*—Aung Moe
(74) *Attorney, Agent, or Firm*—Jacobson Holman PLLC (57) ABSTRACT

The handle grip and electronic controls of a handle control for a lens zoom speed control are ergonomically designed to provide quick comfortable access to all of the control switches. While grasping the rubberized foam handle grip in the palm of the hand of the operator, a thumb engages and holds a push button or rocker switch to switch between the wide angle and telephoto mode. Simultaneously, an inner edge of the forefinger engages and rotates a speed control dial to increase or decrease the speed of lens zoom in the selected wide angle or telephoto mode as controlled by engagement of the thumb with the appropriate mode switch. Rotation of the speed control dial away from the operator (in a counterclockwise direction), causes an increased speed of zooms whereas rotation of the dial towards the operator (in a clockwise direction) decreases the speed of zoom (in the selected wide angle or telephoto mode).

9 Claims, 9 Drawing Sheets

HANDLE CONTROL FOR LENS ZOOM SPEED CONTROL

FIELD OF THE INVENTION

The present invention relates to a system for controlling zoom speed of a camera in one of a wide angle or a telephoto mode. The system is secured near to the camera and electronically connected to the camera to remotely control the speed of zoom in the selected wide angle or telephoto mode.

BACKGROUND OF THE INVENTION

Professional videographers have long had the advantage of being able to rapidly control camera zoom, in or out, so as to zoom on an object using a lens control integrated into professional broadcast cameras. This advantage comes at a cost; and as a result most professional videography equipment is very expensive.

Accordingly, it would be at an advantage if a new home use video camera (camcorder) employing digital video camera recorder technology (DV, mini DV), super VHS (S-VHS) or other new or old video equipment, were capable of altering the zoom and telephoto mode speed control remotely and with precision. Also the ability to zoom in and out at variable speeds and to maintain a set speed with a control or dial is desirable. This allows so called "home use" and "prosumer" camcorders similar precise control that has previously only been available in expensive professional cameras.

SUMMARY OF THE INVENTION

Accordingly, it is an object of the present invention to mount a video camera, or other type of camera, on or be positioned near to a unique zoom handle grip to provide a precession variable-speed control over camera zooms or other adjustable camera parameters. A pressure sensitive thumb control actuator causes engagement of the camera lens in one of a wide angle or telephoto mode, and a separate, easily accessible speed control dial is rotatable to control the speed range of zoom of the lens in the selected one of the wide angle or telephoto mode. The switching between the telephoto and wide angle mode may be achieved by two separate buttons, a pressure sensitive rocker switch aligned parallel with the longitudinal axis of the handle grip or a pressure sensitive rocker switch extending perpendicular to the longitudinal axis of the handle grip. The pressure sensitive rocker switch may also be replaced by a rocker potentiometer.

The hand grip is uniquely styled to relieve the operator of having the problem encountered with prior systems of holding and maintaining predetermined amounts of pressure on a speed control lever in the wide angle or telephoto mode to achieve corresponding predetermined speeds of focus. By the present invention, the relative amount of speed of zoom in a fast to slow range is variably achieved by the speed control dial. The rotation of the dial causes variation of lens zoom from anywhere from a slow crawl, to fast and then to slow again.

The handle grip and electronic controls are ergonomically designed to provide quick comfortable access to all of the control switches. While grasping the rubberized foam handle grip in the palm of the hand of the operator, a thumb engages and holds a wise-to-telephoto actuator in the form of a push button, switch, a rocker switch or a rocker potentiometer to smoothly switch between the wide angle and telephoto mode. Simultaneously, an inner edge of the forefinger engages and rotates a speed control dial to increase or decrease the speed of lens zoom in the selected wide angle or telephoto mode as controlled by engagement of the thumb with the appropriate mode actuator. Rotation of the speed control dial away from the operator (in a counterclockwise direction), causes an increased speed of zoom whereas rotation of the dial towards the operator (in a clockwise direction) decreases the speed of zoom (in the selected wide angle or telephoto mode).

Alternatively, the speed limit for control of the zoom of the lens may be preset by relative positioning of the speed control dial, prior to engagement of the wide angle or telephoto mode actuator. When the mode is subsequently set by engagement of the thumb with the appropriate mode actuator, the camera will instantaneously be controlled to the speed previously set by the speed control dial.

In one embodiment, control of the camera lens is achieved through the use of a circuit integral with the handle grip. An extension cable extends from a circuit housing of the handle grip for connection with a camcorder. One end of the cable includes a male plug for insertion into a local application control bus system (LANC) control jack located on the camcorder. The control jack is used for controlling the tape transport of video equipment and other peripherals connected to the camcorder. This jack has the same function as a jack labeled as CONTROL L or REMOTE.

The circuitry of the present invention sends zoom, focus and other commands through the video camera's built in LANC protocol, which is standard in DV camcorders manufactured by Sony and Canon to name a few. Alternatively, the controller cable is inserted into a standard 8 jack on the lens motor drive of the video camera. Older model cameras, or even professional camera equipment, may be retrofitted to cooperate with the circuitry of the present invention to control zoom speed.

The zoom handle grip is connected by a bracket to a mounting clamp system. The opening size of the clamp system is variable to accommodate different diameter mounting arms for the cameras tripod or a shoulder support for a video camera or a camera crane/jib, for example.

It is therefore another object of the present invention to provide a handle control for a lens zoom speed having interdependent actuators for control of a zoom speed in one of a wide angle and telephoto mode cooperating with a zoom speed control dial.

It is still another object of the present invention to provide a handle control for a lens zoom speed having a mode actuator for selecting one of a wide angle and telephoto mode and a speed control for controlling the zoom speed in the selected one of the wide angle and telephoto mode with the handle control positioned near to a camera for grasping of a handle, the mode actuator and the speed control by a single hand of an operator.

It is yet another object of the present invention to provide a handle control for a lens zoom speed having a made handle upon which is mounted a circuit housing having a switch for selecting wide angle or telephoto modes, a speed control dial and a clamp mounting system for attachment to an arm connected to a camera or a handle of a tripod for the remote control of the lens zoom speed.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1, 2 and 4 through 6, in particular, a handle control for a lens zoom speed control, embodying the teachings of the subject invention is generally designated as 20. With reference to its orientation in FIG. 1, the handle control includes a handle portion 22 connected to the underside 26 of a circuit housing 24. On an angled lower surface 26 of the circuit housing 24 is located a speed control dial 28.

A bracket 30 is secured at one end 32 by bolts 34a through 34d to a side of the circuit housing 32. At the opposite end 36 of the bracket 30 is located a mounting clamp system 38.

A control cable 42 is secured at one end 40 to the circuit housing 32. At an opposite end 44 of cable 42 is a male plug 46.

Handle 22 includes a centrally located pipe of approximately 1 inch diameter. The pipe is covered with a rubberized foam grip for engagement by a palm of the hand 48 of a camcorder operator. The handle is configured to comfortably fit in the palm of the operator.

The circuit housing 24 projects above the handle and is formed of aluminum. On the rear face 50 of circuit housing 24 is a depressable momentary button switch 52 for actuation of a wide angle mode of operation of a camcorder. Adjacent to button 52 is another button switch 54 for actuation of a telephoto mode of operation of the camcorder. In addition, "record" button switch 56 and "focus" button switches 58a, 58b are located on the rear face 50 of the circuit housing. Also a red LED 60 indicates the record mode of the camcorder. The red LED is mounted on rear face 50 near to the handle. Located on an inclined side 62 of circuit housing 24, is an alert button 64 for reviving a camcorder which has transitioned into a "sleep" mode due to inactivity.

Figure 1:
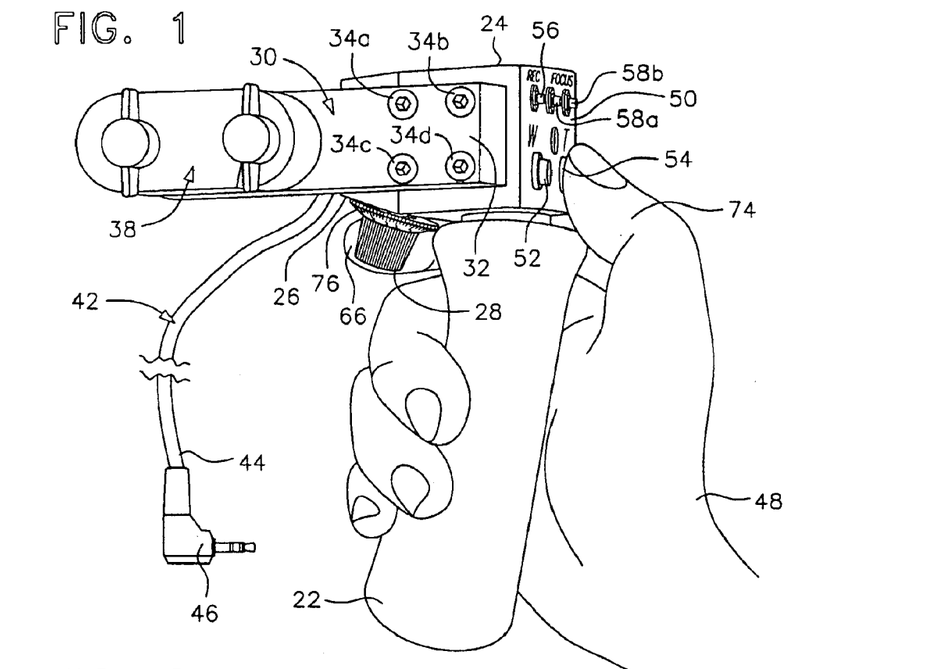
FIG. 1 a side perspective view of the handle control for lens zoom speed control of the present invention, illustrating a forefinger rotating the speed control dial in a clockwise direction and the thumb actuating one of the telephoto mode switches.
Figure 2:
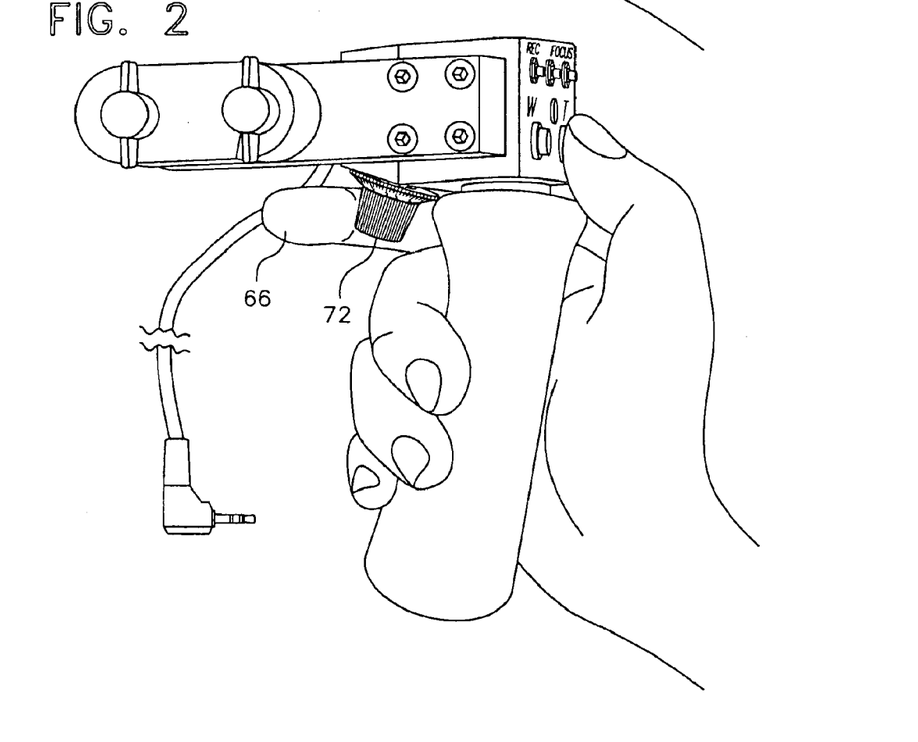
FIG. 2 illustrates the rotation of the speed control dial by the forefinger in a counter clockwise direction to increase the speed of zoom in the telephoto mode.
Figure 4:
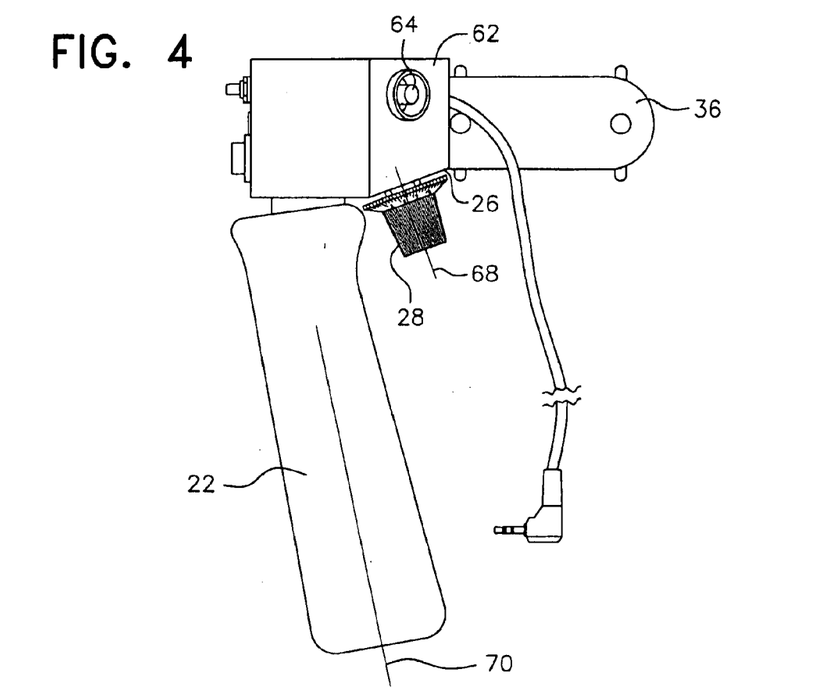
FIG. 4 is an opposite side view of the handle control as compared to the side view of FIGS. 1 and 2.
Figure 5:
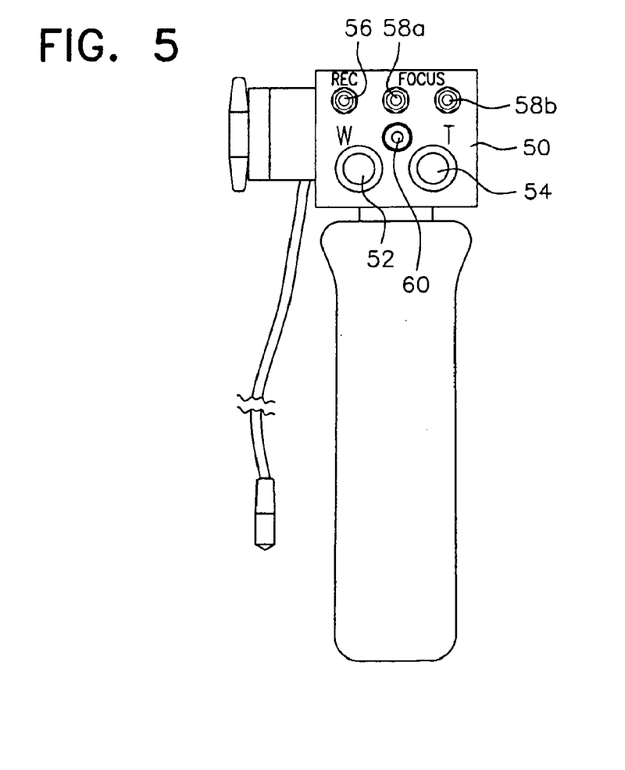
FIG. 5 is a front view of the handle control.

On lower surface 26 is located speed control dial 28 for engagement with the forefinger 66 of the operator as shown in FIGS. 1 and 2. A longitudinal axis 68 of the speed control dial is positioned at an angle of 5 to 15 degrees, preferably 10 degrees, with respect to the longitudinal axis 70 of handle 22 as shown in FIG. 4.

A separation distance between the longitudinal axis of the speed control dial and the longitudinal axis of the handle is approximately 1½ inches. The relative positioning of the speed control dial with respect to the handle 22 provides a natural ergonomic handling of the handle control. The speed control dial is easily grasped with the forefinger 66 for rotation in one of a clockwise and counter clockwise direction.

As shown in FIG. 1, the tip of the forefinger 66 engages the grooves 72 of the speed control dial so as to rotate the speed control dial in a counterclockwise direction by extension of the forefinger to a position as shown in FIG. 2. Similarly, when the forefinger is retracted, the speed control dial is rotated in a clockwise direction.

When either of the mode actuator bottons 52 or 54 are depressed and held by the thumb 74 of the operator 48, the speed control dial 28 will control the speed at which the camera is caused to adjust the zoom of its lens in the respective one of the wide angle or telephoto modes. The rotation of the speed control dial in a counterclockwise direction will instantaneously increase the speed at which the camera zooms in the designated mode. Alternatively, rotation of the speed control dial in a clockwise direction slows down the speed of zoom in the selected mode.

The speed control dial 26 includes numeric indicia 76 ranging from 0 to 9. Between each integer are four hash marks for fine tuning. The speed control dial may be rotated while noting the marked numbers of the dial to repeat a particular zoom movement, if necessary.

Figure 3:
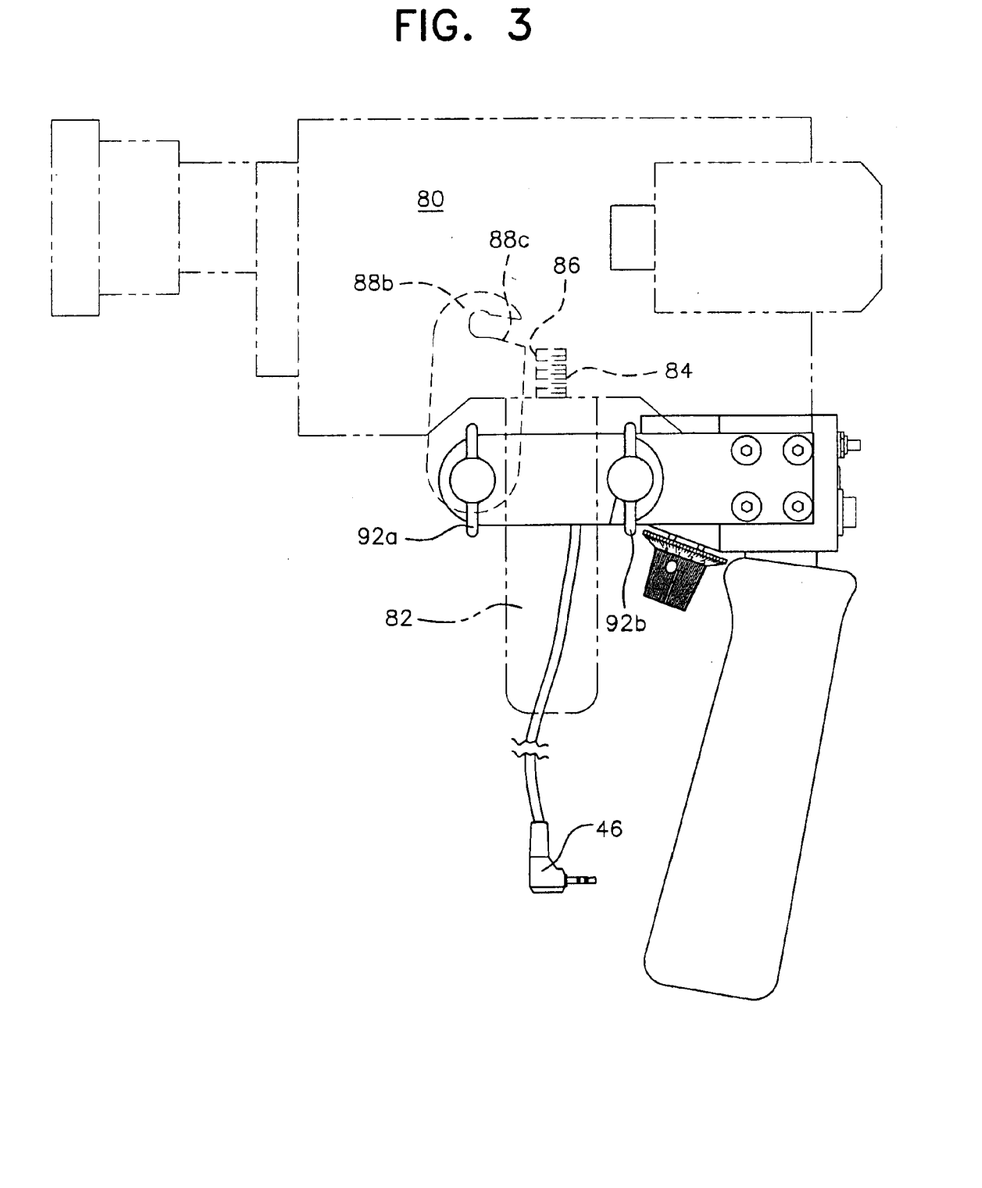
FIG. 3 illustrates the mounting of a camcorder on top of the handle control by engagement of the mounting clamp system with an arm secured to the camcorder so as to hold and operate the camcorder by a single hand.

As shown in FIG. 3, the mounting of a video camera 80 on the handle control of the present invention can be achieved by initially mounting an arm 82 by threaded stud 84 into the bottom female threaded opening 86 of the camera 80. The clamp mounting system 38 secures the arm 82 to the handle control.

Figure 6:
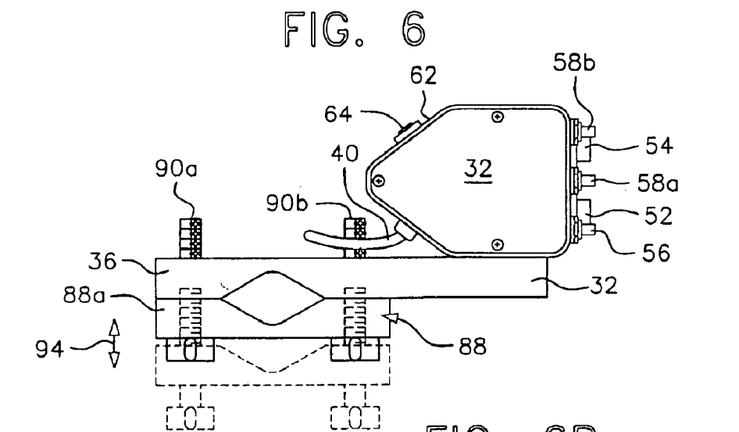
FIG. 6 is a top plan view of the handle control illustrating in dotted lines the opening of a movable jaw of the mounting clamp system.

At the end 36 of the bar 30 is located a movable jaw 88 which is releasably secured to the bracket 30 (forming a fixed jaw) by two bolts 90a, 90b terminating in wing nuts 92a, 92b, respectively. As shown in FIG. 6, upon movement of the bolts 90a, 90b and the movable jaw 88 in the direction of arrow 94, as shown in dotted lines, an opening is created for receipt of arm 82.

One end 88a of movable jaw 88 is pivotally mounted on bolt 90a with the opposite end 88b having a groove 88c for engaging with bolt 90b when wing nut 92b is loosened for swinging the movable jaw 88 into the position shown in FIG. 3. After arm 82 is inserted between the movable jaw 88 and the fixed jaw portion of end 36 of bracket 32, the movable jaw 88 is swung back into position so as to engage bolt 90b. The wing nuts 92a and 92b are then tightened to secure the movable jaw 88 and therefore the arm in position on top of the handle control of the present invention as shown in FIG. 3. The plug 46 will then be inserted into the appropriate receptacle in the camcorder 80 for electronically controlling of the camcorder by the circuitry contained in the circuit housing as will be explained with reference to FIGS. 12 and 13.

Figure 6A:
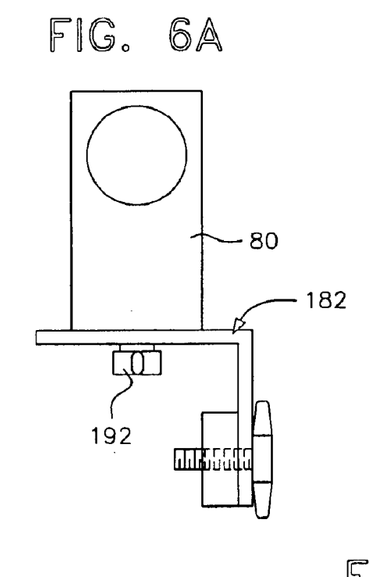
FIGS. 6a and 6b show an alternative camera mount.
Figure 6B:
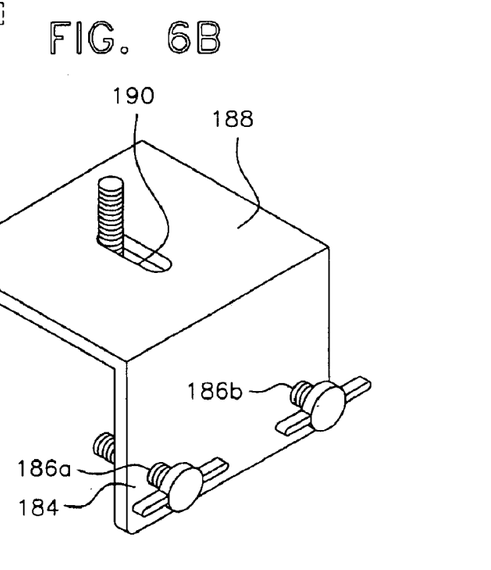
Figure 6C:
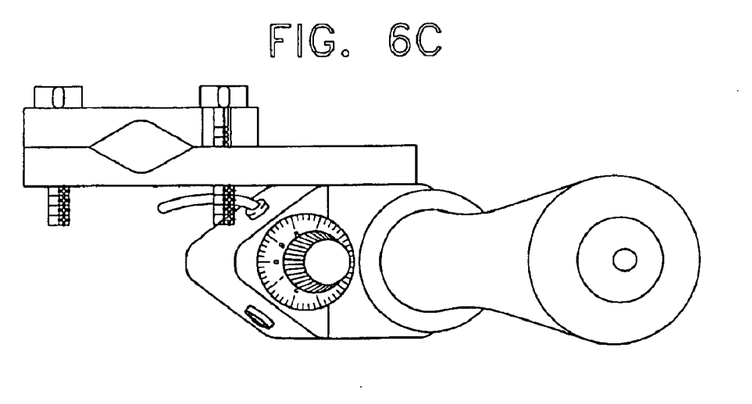
FIG. 6c is a bottom view of the handle control shown in FIG. 6.

With reference to FIGS. 6a and 6b, in an alternative embodiment, the arm 82 is replaced by an L-shaped bracket 182 having a first leg 184 with a pair of spaced mounting holes 186a and 186b. A second leg 188 of bracket 182 is perpendicular to leg 184 and has an elongated slot 190 for receiving a conventional camera mounting screw 192. The bracket is positioned so that leg 184 is vertically oriented with holes 186a and 186b registering with bolts 90a and 90b. Leg 184 replaces movable jaw 88 and is held in place on bolts 90a and 90b by wing nuts 92a and 92b. The arrangement orients leg 188 in a horizontal position. A camera 80 is then mounted on the top of leg 188 by conventional screw 192.

Figure 7:
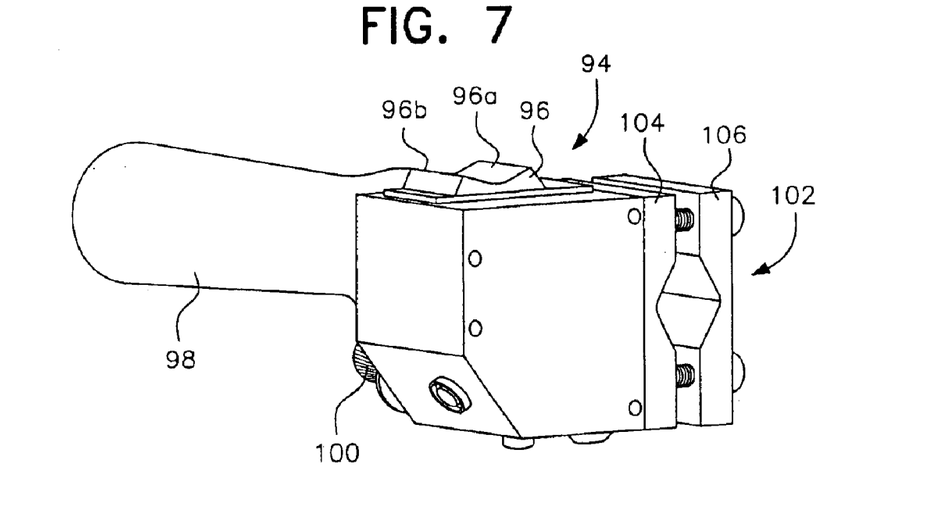
FIG. 7 is an end perspective view of an alternate embodiment of the handle control system of the present invention illustrating a rocker switch or a rocker potentiometer having a longitudinal axis extending perpendicular to the longitudinal axis of a handle.
Figure 8:
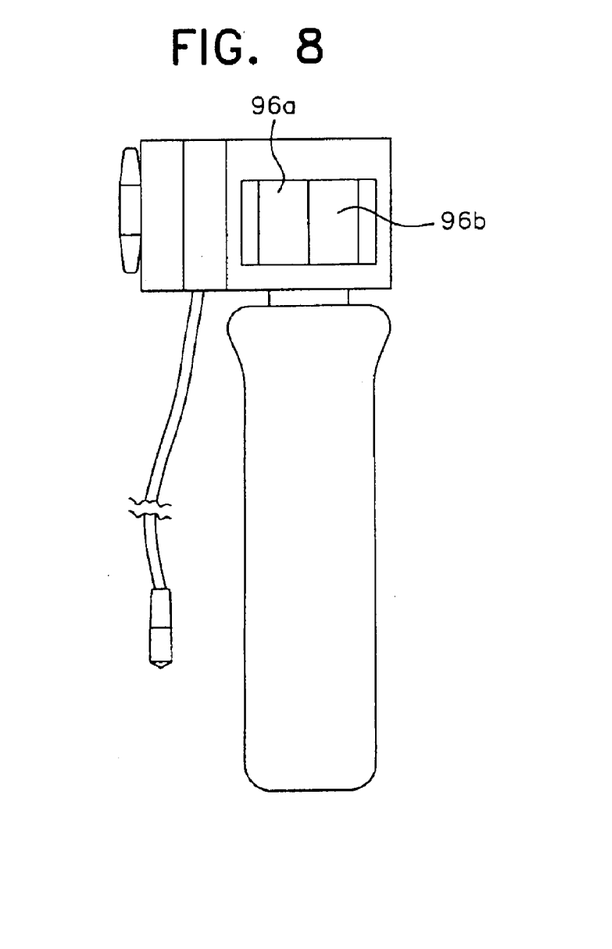
FIG. 8 is a top plan view of FIG. 7.
Figure 9:
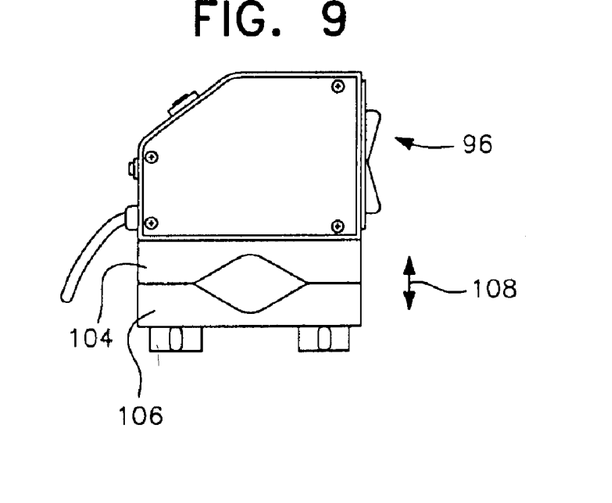
FIG. 9 is an end view of the handle control shown in FIGS. 7 and 8.

In FIGS. 7 through 9, an alternate embodiment of the handle control of the present invention is shown and designated by reference numeral 94. In this embodiment, instead of two buttons for switching between a wide angle and telephoto mode, a single rocker switch 96 having a longitudinal axis perpendicular to the longitudinal axis of the handle 98 is used. The thumb engages the rocker switch and depresses either side 96a or 96b to shift between wide angle and telephoto modes. A speed control dial 100 is engaged by the forefinger of the operator grabbing the handle 98 to control the speed of zoom in the wide angle or telephoto mode dependant upon the depression of the rocker switch 96 in one of two directions.

A clamping system 102 includes a movable bar 106, movable with respect to fixed bar 104 to move in the direction of arrow 108 so as to engage an arm fixedly secured to the base of a camcorder or for mounting the handle control on an arm of a tripod so as to be adjacent to a tripod mounted camera. This arrangement also provides a comfortable ergonomic fitting of the handle 98 into the palm of the operator for switching between wide angle and telephoto modes by the thumb engaging the rocker switch 96 and the forefinger engaging the speed control dial 100.

Figure 10:
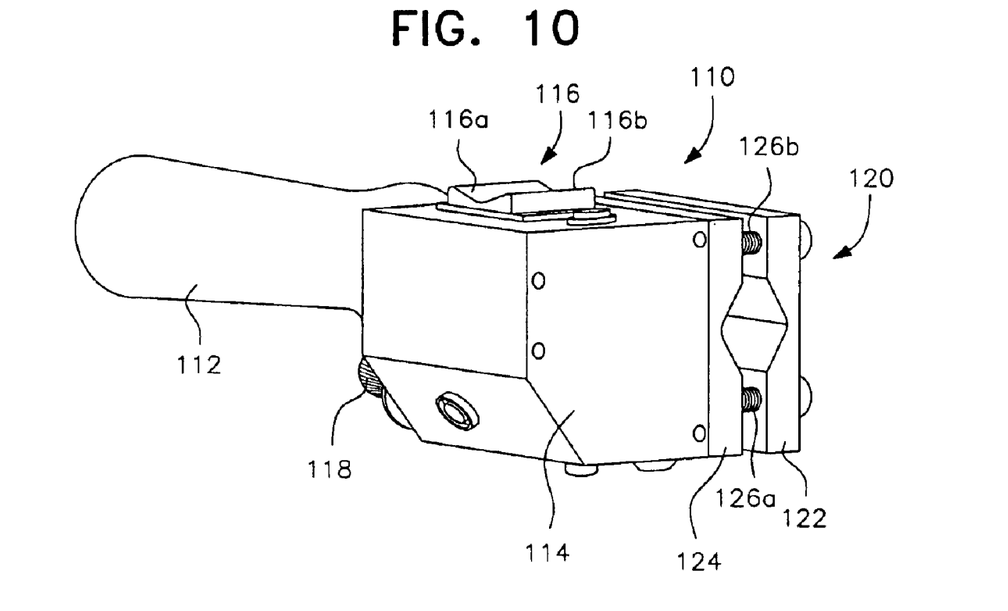
FIG. 10 is an alternate embodiment of the handle control of the present invention, having a pressure sensitive rocker switch with a longitudinal axis extending parallel to the longitudinal axis of the handle.

Similarly, in FIG. 10, the handle control also embodying the teachings of the present invention is designated as reference numeral 110. In this embodiment, the handle 112 supports a circuit housing 114 having a rocker switch 116 with its longitudinal axis extending parallel to the longitudinal axis of the handle 112. Two sides 116a, 116b of the rocker switch 116 shift the circuitry between the wide angle and the telephoto modes. A speed control dial 118 is used to control the speed of zoom in the selected one of the wide angle or telephoto mode.

As in the other embodiments, a clamping system 120 includes a movable jaw 122 and a fixed jaw 124. The movable jaw is mounted on two bolts 126a, 126b for movement towards and away from the fixed jaw.

Figure 11:
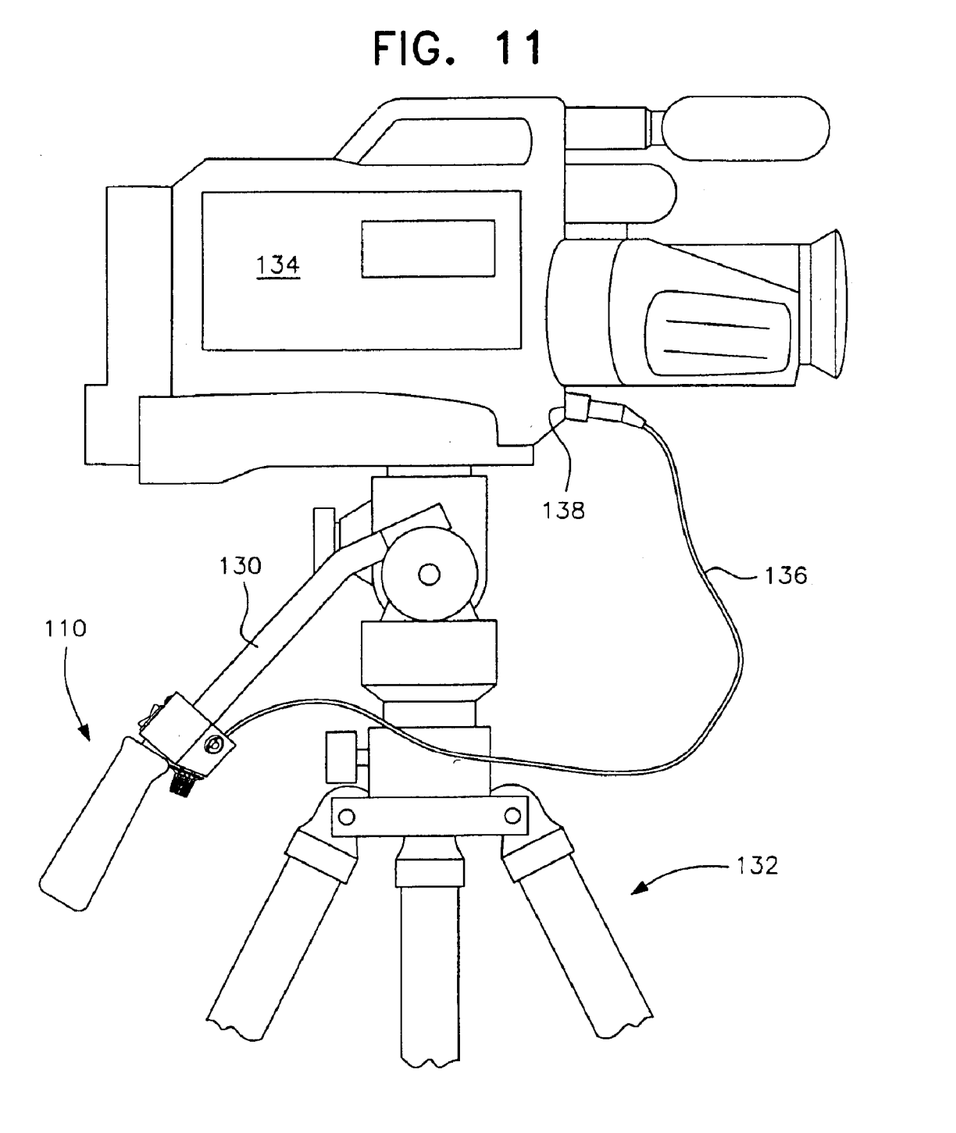
FIG. 11 illustrates the handle control of the present invention mounted on a tripod pan handle for movement of the handle control with the pan handle.

An arm secured to a camcorder may be positioned between the two jaws 122, 124 or the jaws may be fixed to an arm 130 of a tripod 132 for movement with the arm 130 so as to pan with the camcorder 134 as well as to move up and down with the vertical displacement of the camcorder 134. As shown in FIG. 11, an extension cable 136 is connected to an input 138 of the camcorder so as to control the camcorder by way of the handle control 110 fixed on the arm 130 by the fixed and movable jaws 122, 124.

Figure 12:
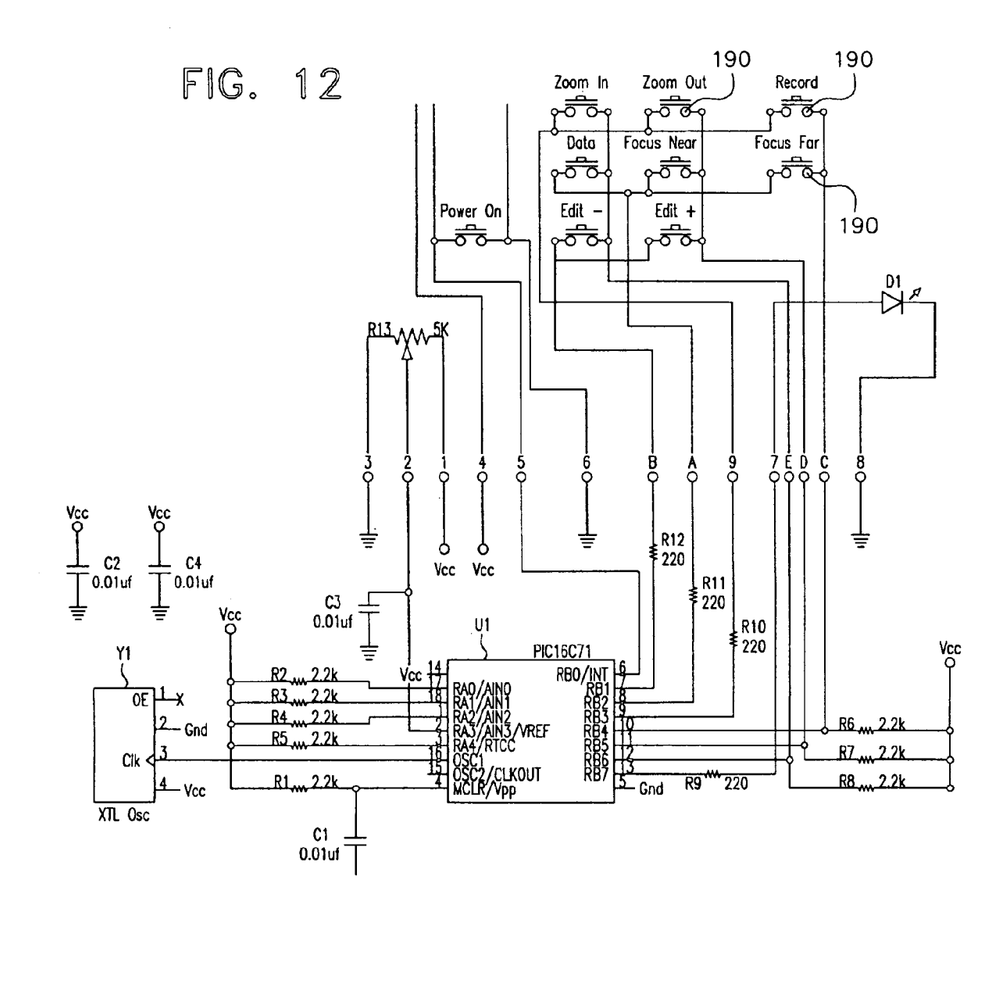
FIG. 12 is a circuit diagram illustrating the circuitry of the present invention contained in the circuit housing of the handle control for remotely controlling the drive motor of a camcorder.

A schematic for the variable zoom of the present invention is shown in FIG. 12. The circuitry on the circuit board includes a microprocessor U1, an analog-to-digital (A/D) converter (not shown), and an oscillator Y1, as well as various resistors and capacitors. The circuit also includes a potentiometer R13 and a plurality of camera control switches 190 wired to the microprocessor U1. These camera control switches 190 representatively include switches, preferably activated by buttons, for zoom in, zoom out, record, data, focus near, focus far, edit+ and edit−.

The microprocessor U1 may be embodied as an integrated chip such as the PIC16C71 manufactured by MicroChip, Inc. In the preferred embodiment depicted, the A/D converter is built into the microprocessor but other configurations, including a look-up table, may be used. The microprocessor includes a memory capability with software for controlling microprocessor function.

An oscillator, a crystal, or other equivalent device may be used to provide the clock input to the microprocessor. In the embodiment shown, a 4 MHz oscillator Y1 is used, but other clock rates, with or without supporting circuits such as a divider circuit, may of course be used.

Figure 13:
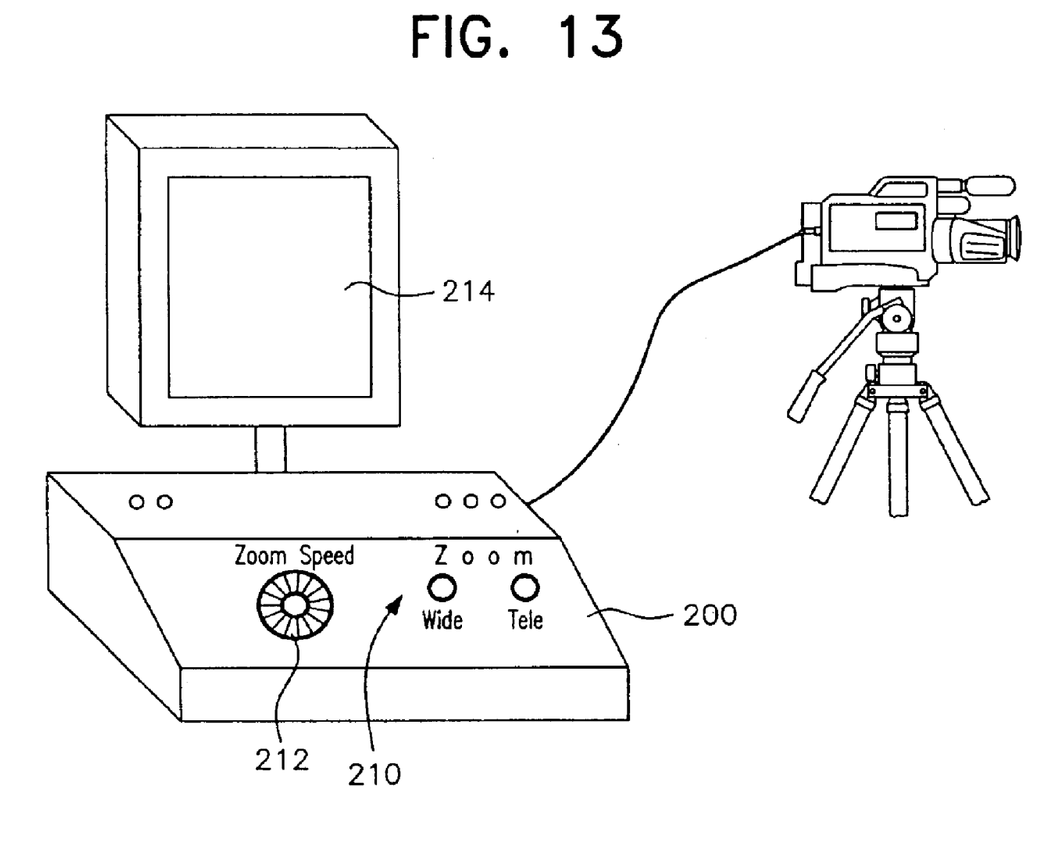
FIG. 13 is a general control panel incorporating the circuitry of the present invention.

With reference to FIG. 12, pins 4,5,6 plug into the video camera (not shown). The variable zoom is therefore powered by the camera through pin 4, with other power inputs within the circuit feeding off of pin 4. Alternatively, the circuitry for the present invention may be incorporated into other device configurations such as a general control panel. An example of such a panel is shown in FIG. 13. The panel 200 includes a plurality of buttons 210, for activating a respective plurality of switches. These switches control activation of zoom in and zoom out, as well as others appropriate to the configuration such as those shown in FIG. 12. The panel also includes a manually operated dial 212 for varying the voltage across the potentiometer R13. The control panel may be used in conjunction with a screen 214 for displaying the image being viewed by the camera.

As the potentiometer R13 is dialed, the voltage changes across pin 2. These voltage changes are sampled by the microprocessor and converted to digital signals by the A/D converter. The digital signals are, in turn, converted in software to a range of zoom speeds. The determined zoom speed is sent to the camera via pin 5 and used to control the zoom rate.

Conversion to zoom speed is accomplished by establishing a relationship between voltage and zoom speeds. In the preferred embodiment, each voltage read with pin 2 is associated with one of eight zoom speeds. Zoom speed can be divided into more or fewer ranges as desired. Not all cameras are equipped to respond to eight different speeds but may instead recognize only a high, e.g., the upper four speeds, and a low, e.g., the lower four speeds, rate of zoom.

The association between voltage and zoom speed may be set forth in software. Alternatively, the conversion from a digital voltage signal to a selected zoom speed may be performed using an established look-up table or other means as would be known by persons of skill in the art. In any case, a predetermined relationship is established between voltage from the potentiometer and a selected zoom speed. Depending upon the voltage, as varied through adjustment of the potentiometer, the appropriate zoom speed is indicated and conveyed to the camera.

The zoom speed can be adjusted dynamically such that the speed of the zoom may be changed while zooming. The user of the varizoom depresses one of the zoom in or zoom out buttons and by simultaneously dialing the potentiometer can select and/or continuously vary the rate of the zoom as desired. The microprocessor continually reads the potentiometer for voltage changes as long as one of the zoom buttons is depressed.

The varizoom uses a scanning switch array in order to run a number of switches greater than the number of wires. As shown, resistors R6, R7 and R8 pull up the voltage on one leg of each switch through pins C, D and E, respectively. Switches for zoom in, data, and edit− share a common leg through pin E; switches for zoom out, focus near, and edit+ share a common leg through pin D. Switches for record and focus far similarly share one common leg through pin C.

The second leg of each switch is also common with at least one other switch, as shown. For example, the second leg of zoom in, the second leg of zoom out, and the second leg of record are each completed through pin 9. Similarly, the second leg of each of edit+ and edit− is completed through pin B. Pins A, B and 9, responsive to pressing of the associated buttons, respectively, connect the second legs to power, and resistors R10, R11 and R12 allow current to flow to the microprocessor.

In order to determine which of the switches is being activated through the pressing of an associated button, the microprocessor continually scans the matrix through RB1–RB7 for positive voltage from the switch array. In accordance with the preferred embodiment, this is done using resident software on the chip. One leg, or row, of the switches, e.g. those connected through R6, is turned on at a time to see if any are "on". If one leg is "on", then the microprocessor looks at the other leg, e.g. pin A and pin 9, to see which is the corresponding button being pressed. With a matrix as shown, such a sequence of scanning is necessary to identify active switches when more than one switch has been activated. The function and use of a scanning switch array such as this is known in the art.

Software used to control the scanning of the matrix as well as the conversion of the digital signals to zoom speeds may be written in assembly language. Alternatively, such software could be implemented using a programmable read only memory (PROM) or erasable programmable read only memory (EPROM). In the preferred embodiment, the software is written in PIC assembly code using the MPLab environment available from the manufacturer of the microprocessor.

In the preferred embodiment, the microprocessor samples the potentiometer only when the scanning of the switch array identifies positive voltages indicating activation of one of the zoom buttons. When buttons other than the zoom buttons are depressed, the microprocessor does not sample the potentiometer.

The voltage reference read from the potentiometer is input to the microprocessor through RA3. Inputs RA0–RA2 and RA4 are pulled up to the voltage level by resistors R2–R5 but are not used in this embodiment. The master clear input (MCLR) operates in a standard way, with bleed-off capacitor C1 and resistor R1 to slow charging, as would be known by persons of skill in the art.

Although the embodiments discussed so far contemplate the use of a zoom control circuit, it is to be understood that other ways of implementing zoom control are contemplated. For example, in one embodiment, such as that shown in FIG. 7, the rocker switch 96 may be replaced by a rocker potentiometer arranged in series with a potentiometer that forms speed control dial 100. In this arrangement, the speed dial 100 limits the amount of voltage passing across rocker potentiometer 96 in order to limit the speed of a zoom from telephoto to wide angle or vise versa.

With this arrangement, the LANC connector 46 found in prior embodiments may be replaced by a conventional eight or twelve pin connector for use with lenses such as those made by Fujinon or Canon. Thus, a zoom control having the advantages of the present invention may be used in conjunction with professional lenses.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A control system for a video recorder camera, said control system comprising:
   a handle adapted to be held in a palm of an operator,
   an actuator for selecting one of a wide angle mode and a telephoto mode of a video camera recorder, said switch being depressable by a thumb of a same hand of the operator holding said handle,
   a speed control device for controlling zoom speed of a video recorder camera and for engagement by a forefinger of the same hand of the operator holding said handle, and
   a control cable for connecting to the video recorder camera and for transmitting signals from said switch and said speed control device to the video recorder camera so that the operator can, by natural, comfortable movement of the thumb and the forefinger, control zoom speed in one of said wide angle and said telephoto mode of operation of the video camera recorder when the handle is held in the palm of the operator.

2. A control system as claimed in claim 1, wherein said actuator is one of two push buttons.

3. A control system as claimed in claim 1, wherein said actuator is a rocker switch being engageable with two switches.

4. A control system as claimed in claim 3, wherein a longitudinal axis of said rocker switch extends perpendicular to a longitudinal axis of said handle.

5. A control system as claimed in claim 3, wherein a longitudinal axis of said rocker switch extends parallel to a longitudinal axis of said handle.

6. A control system as claimed in claim 1, wherein a longitudinal axis of said speed control device extends at an angle in the range of 5°–15° with respect to a longitudinal axis of said handle so that the speed control device is comfortably accessible by the forefinger of the hand holding the handle.

7. A control system as claimed in claim 1, further comprising a clamping system for attaching the control system remote from a video recorder camera.

8. A control system as claimed in claim 1, wherein said handle is attached to a control circuit housing, said control cable extending from said control circuit housing.

9. A control system as claimed in claim 1, wherein said speed control device is a potentiometer.

* * * * *